United States Patent [19]
Mangrulkar et al.

[11] Patent Number: 5,237,862
[45] Date of Patent: Aug. 24, 1993

[54] ADAPTIVE METHOD OF CYLINDER MISFIRE DETECTION IN AN INTERNAL COMBUSTION ENGINE

[75] Inventors: Suresh M. Mangrulkar, Farmington Hills; John W. Piatak, Livonia, both of Mich.

[73] Assignee: Ford Motor Company, Dearborn, Mich.

[21] Appl. No.: 902,351

[22] Filed: Jun. 22, 1992

[51] Int. Cl.$^5$ .......................................... G01M 15/00
[52] U.S. Cl. .................................................. 73/116
[58] Field of Search ................ 73/116, 117.3, 35; 123/419, 479, 436; 364/431.07, 431.08; 340/439

[56] References Cited

U.S. PATENT DOCUMENTS

| | | |
|---|---|---|
| 3,972,230 | 8/1976 | Hanson et al. . |
| 4,179,922 | 12/1979 | Bouverie et al. . |
| 4,930,479 | 6/1990 | Osawa et al. . |
| 5,021,960 | 6/1991 | Manaka et al. ............... 123/436 |
| 5,041,980 | 8/1991 | Maddock et al. . |
| 5,044,195 | 9/1991 | James et al. . |
| 5,056,360 | 10/1991 | Dosdall et al. . |
| 5,109,695 | 5/1992 | James et al. . |
| 5,117,681 | 6/1992 | Dosdall et al. . |

OTHER PUBLICATIONS

SAE Technical Paper 870386, "Microprocessor Based Data Acquisition for Analysis of Engine Performance", by John James, Jim Murphy, James Dosdall and Kenneth Marko, Feb. 23-27, 1987.

*Primary Examiner*—Robert Raevis
*Attorney, Agent, or Firm*—Roger L. May; Mark L. Mollon

[57] ABSTRACT

An adaptive method of detecting a misfiring cylinder in a spark-ignited internal combustion engine during substantially all engine operating conditions, including most no-load operation. The method includes the step of normalizing an engine acceleration-independent and engine speed-independent power cycle time differential signal for a particular cylinder of the engine, obtained from consecutive power cycle time periods of an engine cycle, utilizing a calibration parameter stored in the memory for the particular cylinder, to obtain a normalized power cycle time differential signal for the particular cylinder. The method also includes the step of comparing the normalized power cycle time differential signal to a misfire threshold signal stored in the memory to determine if the cylinder is misfiring. Preferably, the misfire threshold signal is based on at least one engine operating parameter. The method also includes the step of adaptively modifying the calibration parameter stored in the memory based on the comparison.

20 Claims, 9 Drawing Sheets

ADAPTIVE METHOD OF CYLINDER MISFIRE DETECTION IN AN INTERNAL COMBUSTION ENGINE

TECHNICAL FIELD

This invention relates to a method of detecting cylinder misfire and, more particularly, to an adaptive method of detecting cylinder misfire in an internal combustion engine.

BACKGROUND ART

The prior art teaches a variety of systems for diagnosing operating parameters of an internal combustion engine. One such operating parameter is cylinder misfire. When a cylinder misfires, incomplete combustion occurs and uncombusted fuel is typically introduced into the exhaust system. Additionally, a misfiring cylinder degrades engine performance and efficiency.

U.S. Pat. No. 3,972,230, issued to Hanson et al., discloses an apparatus and method for detecting a malfunction in the cylinders of an internal combustion engine. While the engine is operated at an idle speed, power cycle time periods between successive ignition time are measured to obtain the deceleration rates between successive time periods. Average deceleration rates for the respective cylinders are computed and misfires occurring randomly in the cylinders are detected when individual deceleration rates exceed the average deceleration rates for the corresponding cylinder by a predetermined limit amount.

Other United States patents relating generally to the detection of cylinder misfire or other cylinder malfunctions include U.S. Pat. No. 4,179,922 issued to Bouverie et al., U.S. Pat. No. 4,930,479 issued to Osawa et al., U.S. Pat. No. 5,041,980 issued to Maddock et al., U.S. Pat. No. 5,044,195 issued to James et al., U.S. Pat. No. 5,056,360 issued to Dosdall et al. and U.S. Pat. No. 5,109,695, issued to James et al.

Some engine control systems utilize data from a sensor that cooperates with a wheel, having a plurality of teeth, which is used for detecting engine position in an engine cycle. Existing misfire detection strategies, however, are limited by the operating conditions during which misfire can be detected. For example, misfire detection is difficult during high speed, no-load operating conditions because of, among other reasons, the production inaccuracies of the multi-toothed wheel. One technique for correcting such inaccuracies is shown in U.S. Pat. No. 5,117,681, issued to Dosdall et al. This technique, however, requires a special measurement procedure.

SUMMARY OF THE INVENTION

It is therefore a general object of the present invention to detect cylinder misfire in an internal combustion engine.

It is a further object of the present invention to detect cylinder misfire utilizing an adaptive method during substantially all engine operating conditions, including most no-load engine operation.

In carrying out the above objects and other objects and features of the present invention, an adaptive method is provided for detecting a misfiring cylinder in a spark-ignited internal combustion engine controlled by an electronic controller having non-volatile memory. The method comprises the step of normalizing an engine acceleration-independent power cycle time differential signal for a particular cylinder, obtained from consecutive power cycle time periods of an engine cycle, utilizing a calibration parameter stored in the memory for the particular cylinder, in order to obtain a normalized power cycle time differential signal for the particular cylinder. The method also comprises the steps of comparing the normalized power cycle time differential signal to a misfire threshold signal stored in the non-volatile memory and based on at least one engine operating parameter to determine if the cylinder is misfiring, and adaptively modifying the calibration parameter stored in the memory based on the comparison. In the preferred embodiment, the calibration parameter represents the percent change in consecutive power cycle time periods for the engine under a no-load operating condition and the misfire threshold signal is based on at least engine torque and engine speed.

The advantages accruing to the present invention are numerous. For example, the strategy of the present invention allows the controller to learn production inaccuracies of engine hardware and detect cylinder misfire during substantially all engine operating conditions, including no-load operation of the engine. Thus, the methodology of the present invention widens the engine speed-load envelope over which the cylinder misfire can be reliably detected.

The above objects and other objects, features, and advantages of the present invention will be readily appreciated from the following detailed description of the best mode for carrying out the invention when taken in connection with the accompanying drawings.

BEST MODE FOR CARRYING OUT THE INVENTION

Figure 1:
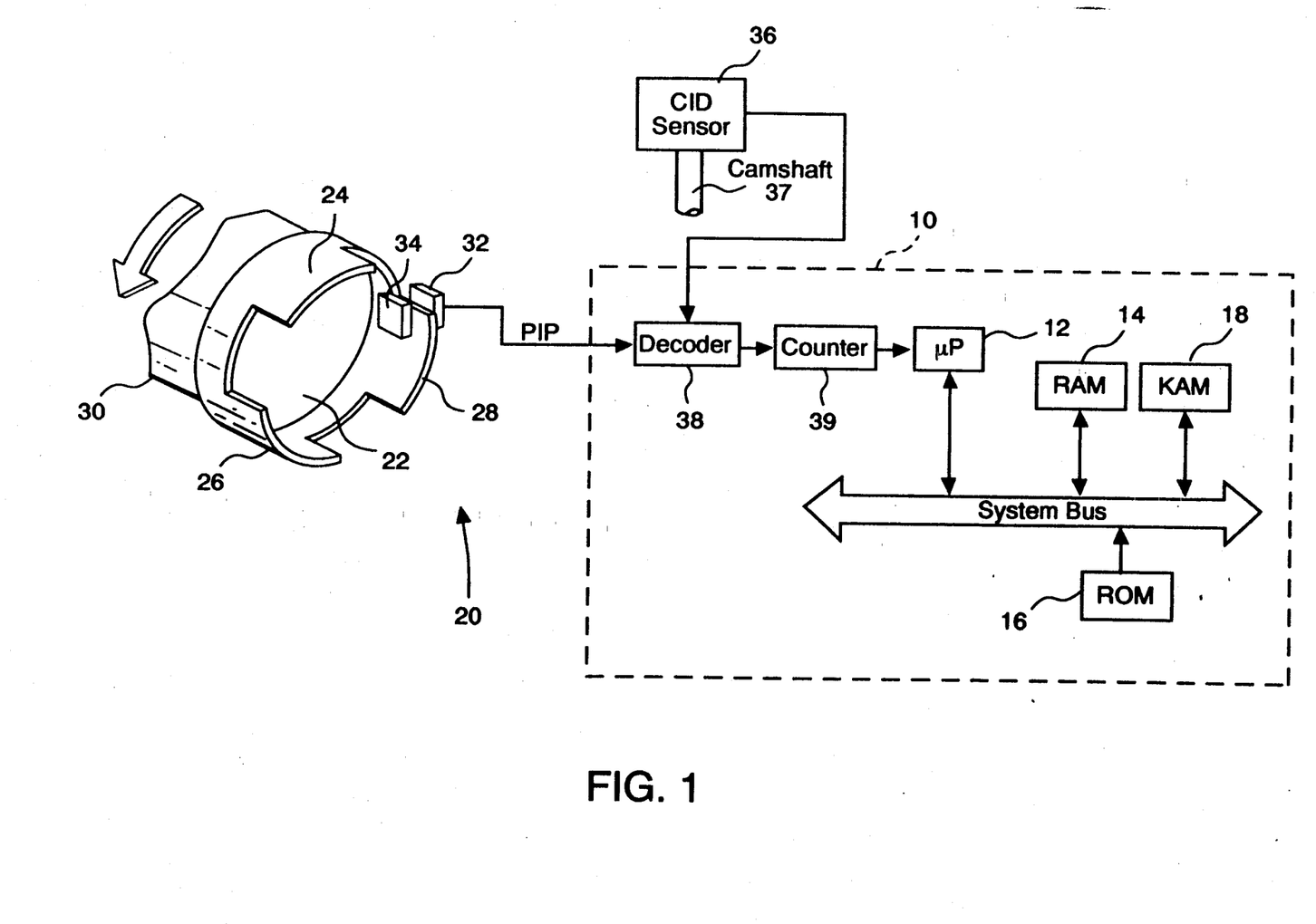
FIG. 1 is a block diagram of a control system, including a low data rate engine position sensing system, for use with the present invention.

Referring now to FIG. 1, there is illustrated a block diagram for a controller, shown generally by reference numeral 10, for detecting cylinder misfire in an internal combustion engine (not specifically illustrated). The adaptive detection strategy is executed by the microprocessor 12, which cooperates with the random access memory (RAM) 14 and the read-only memory (ROM) 16. The microprocessor 12 could be a master vehicle microprocessor, or a slave microprocessor which cooperates with a master vehicle microprocessor. As illustrated, the controller 10 also includes a keep-alive memory (KAM) 18, a non-volatile memory which can be written to and which maintains the integrity of its contents even when the vehicle is not being operated.

With continuing reference to FIG. 1, to accurately detect cylinder misfire, an engine position sensing system, shown generally by reference numeral 20, provides input to the microprocessor 12. As illustrated, this low data rate position sensing system 20 includes a profile ignition pulse (PIP) wheel 22 having a plurality of vanes, or teeth, 24, 26 and 28 formed thereon. The number of vanes formed on the PIP wheel 22 is based on the number of engine cylinders. The PIP wheel 22, shown for use with a six-cylinder internal combustion engine, rotates with the crankshaft 30 of an internal combustion engine. Alternatively, the PIP wheel 22 could rotate with an engine camshaft.

A PIP sensor 32, such as a Hall-effect sensor, detects the position and speed of the crankshaft 30 by cooperating with a permanent magnet 34. As the vanes 24, 26 and 28 pass between the PIP sensor 32 and the permanent magnet 34, the PIP sensor generates a PIP signal. Speed and position, which is typically stated in degrees before top-dead-center, is relayed in the form of a square wave from the PIP sensor 32. Preferably, the vanes 24, 26 and 28 are arranged to generate a PIP signal just before top-dead-center of each respective cylinder. The PIP signal actually indicates the approach to top-dead-center (e.g. 10° before top-dead-center, which is the base timing) of two engine cylinders, one of which is on a power stroke and one of which is on an intake stroke. A cylinder identification (CID) sensor 36 is connected to a camshaft 37 for identifying which of the two cylinders is actually on its power stroke. Since camshaft 37 rotates once for every two rotations of the crankshaft 30, a CID signal is generated having a rising edge corresponding to top dead center in the power stroke of a predetermined cylinder. A decoder 38 receives the PIP signal and the CID signal and provides reference marker signals to a counter 39 to identify the beginning and the ending of timing intervals. The microprocessor 12 can then obtain PIP periods from the PIP signal.

Figure 2:
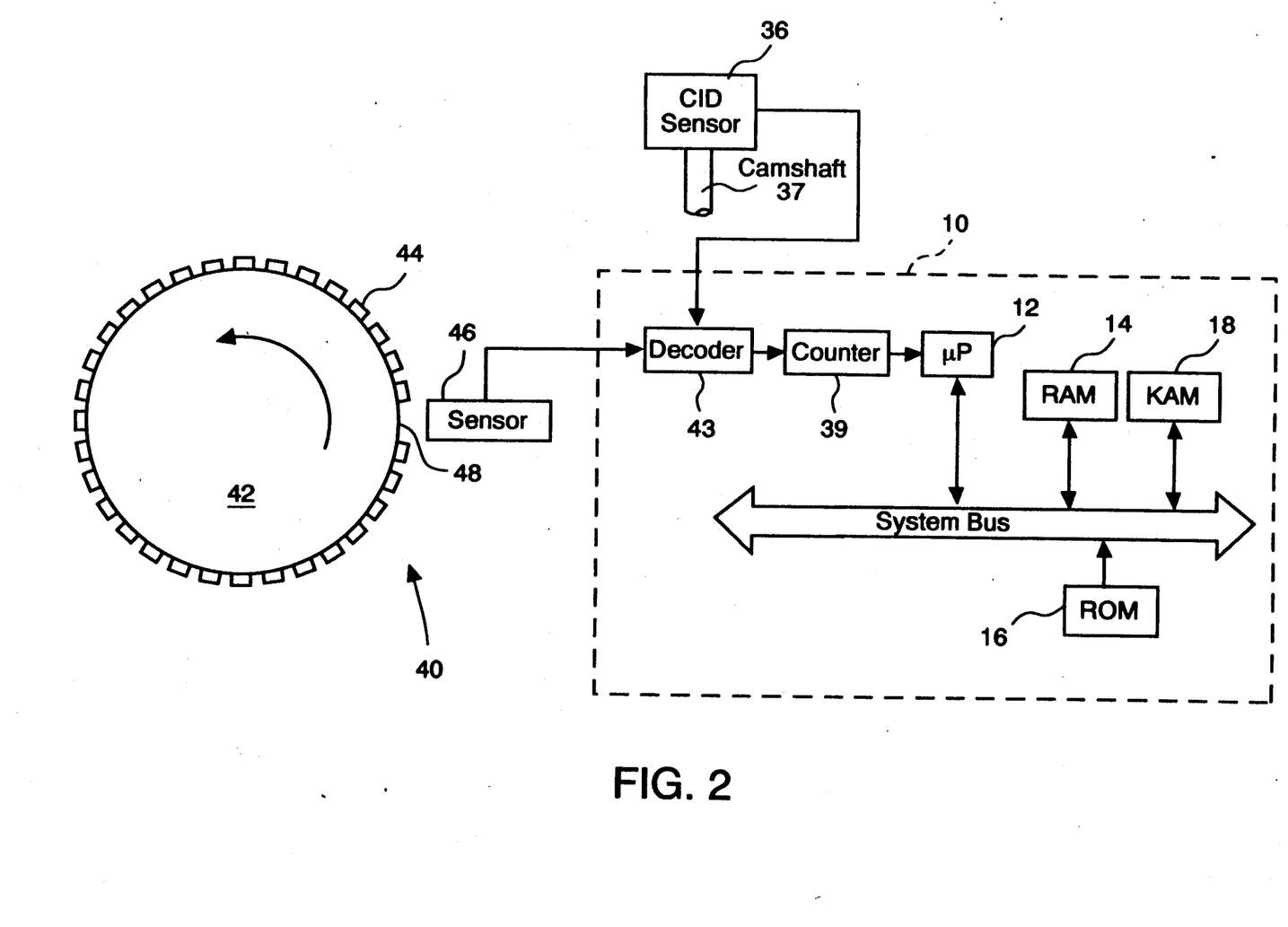
FIG. 2 is a block diagram of a control system, including an alternative higher data rate engine position sensing system, for use with the present invention.

Alternatively, a higher data rate position sensing system, shown generally by reference numeral 40 in FIG. 2, can be utilized with the controller 10. The position sensing system 40 includes a multi-toothed wheel 42 mounted on an engine for rotation with a crankshaft not specifically illustrated. As illustrated in FIG. 2, a plurality of teeth 44 are disposed along the periphery of the wheel 42 at a predetermined angular spacing. Preferably, the teeth 44 are comprised of a magnetically permeable material. A sensor 46, such as a variable reluctance sensor, is disposed in a fixed location proximate to the teeth 44 for sensing each tooth as it passes thereby during rotation of the wheel 42. Alternatively, the sensor 46 could employ Hall effect or fiber optic technology. A missing tooth location 48 is provided on the wheel 42 for providing an absolute location reference, such as top dead center of a particular cylinder, by the detection of a time between tooth pulses which is substantially longer than the average time between pulses. The sensor 46 provides an approximately sinusoidal output voltage which can be processed by a trigger circuit not specifically illustrated to produce a square wave signal having transitions indicating predetermined angular positions of the crankshaft. The cylinder identification (CID) sensor 36 provides camshaft position information to the decoder 43, so as to enable the microprocessor 12 to determine which cylinder is on a power stroke and, therefore, determine which cylinder is misfiring. The sensor 46 output is decoded by the decoder 43 so that position marker signals, which are generated at a selectable angular position, are provided to the counter 39 to identify the beginning and the ending of timing intervals. The microprocessor can then obtain PIP periods from the elapsed time data received from the counter 39.

Figure 3:
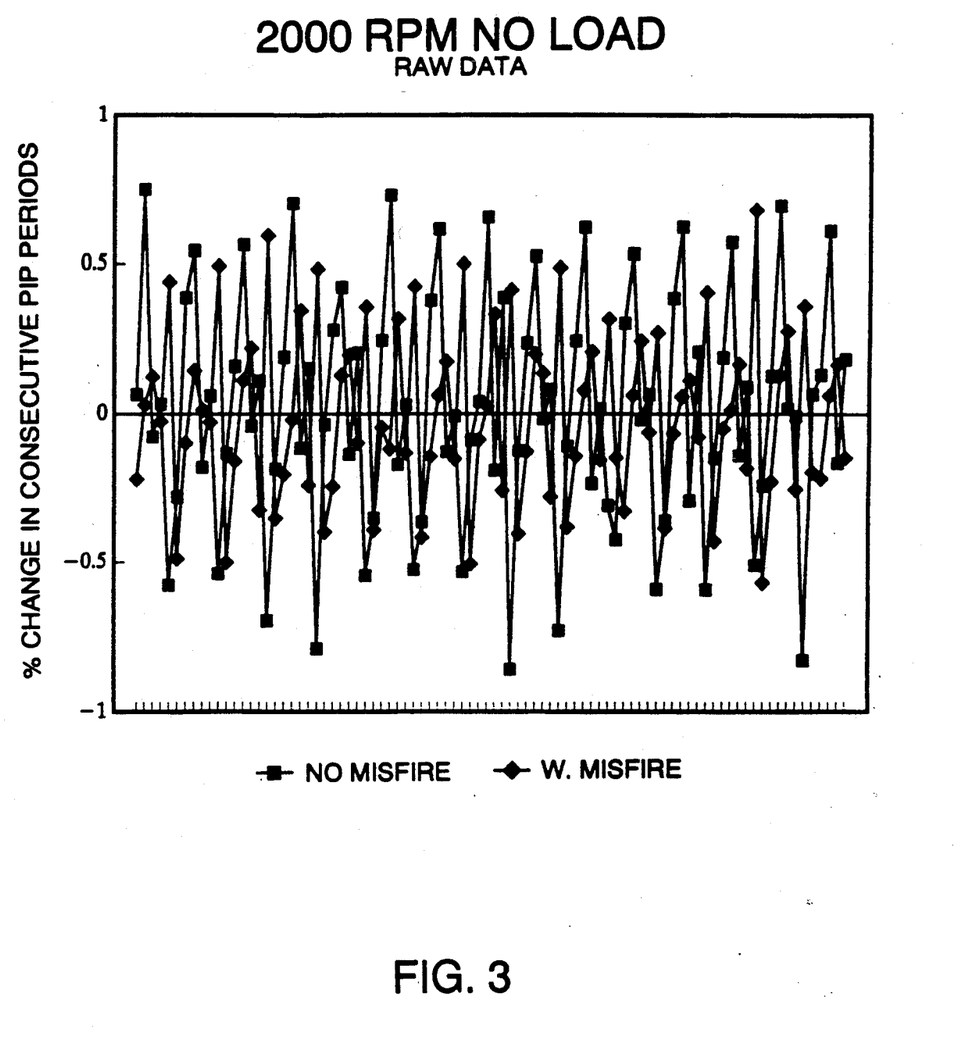
FIG. 3 is a graphical illustration of data representing the percent change in consecutive profile ignition pulse (PIP) periods, or percent change in power cycle time differentials, for a typical 6-cylinder internal combustion engine with and without cylinder misfire, during no-load operation.

Referring now to FIG. 3, there is shown a graph illustrating data from the low data rate sensing system 20 (shown in FIG. 1) representing the percent change in consecutive power cycle times, or PIP periods, for an internal combustion engine under no-load. No-load operation should be understood as meaning engine operation with the transmission out of gear, or in "neutral" or when the vehicle is undergoing closed-throttle deceleration. Under no-load operation of the engine with all cylinders producing generally equal power, the variation in the PIP periods is a function of the production tolerance of the PIP wheel 22. As shown in FIG. 3, it is difficult to identify the misfiring cylinder under no-load engine operation, since the change in power cycle time due to the misfire is masked by the inaccuracies of the production tolerances of the PIP wheel 22.

Figure 4:
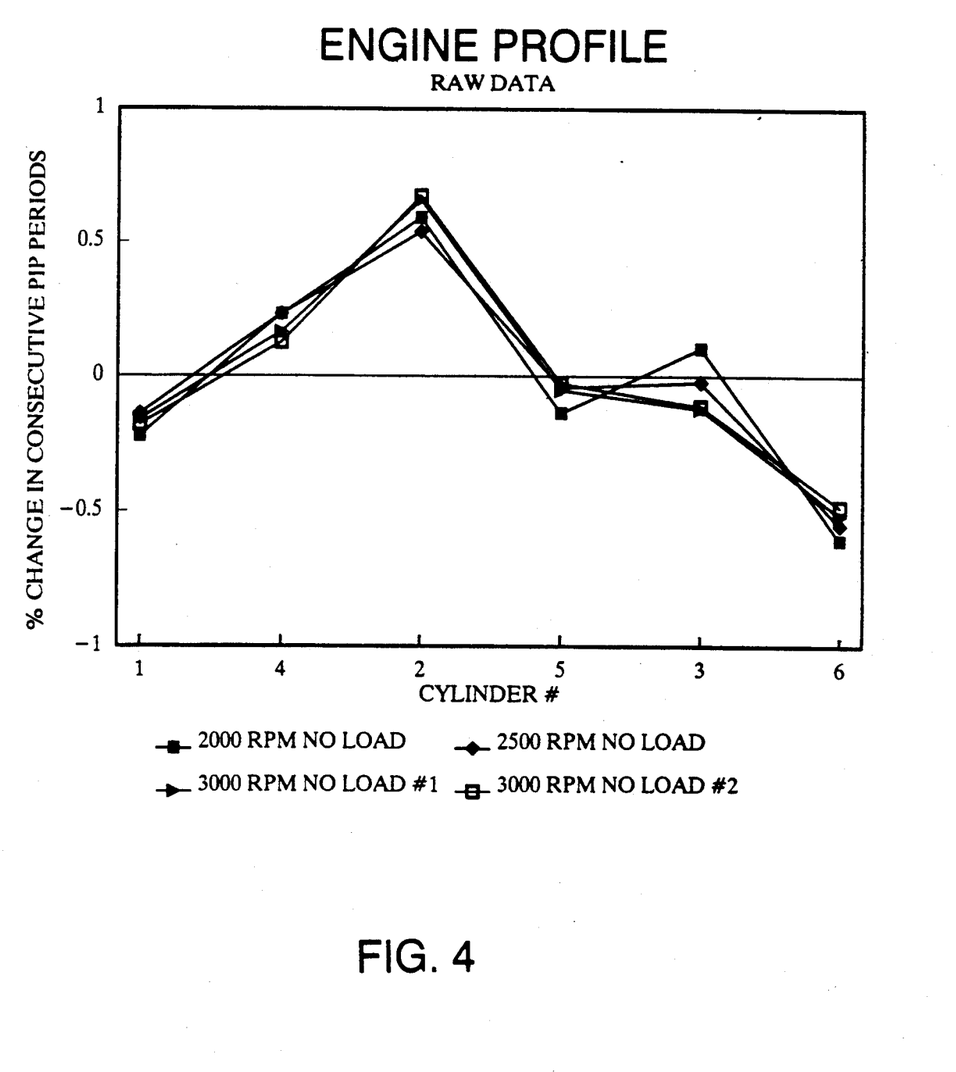
FIG. 4 is a graphical illustration of an engine power cycle profile associated with the PIP wheel shown in FIG. 1 representing the percent change in consecutive PIP periods for each engine cylinder for a typical 6-cylinder internal combustion engine without misfire.

As best shown in FIG. 4, these inaccuracies create a PIP profile unique for a particular production engine. Utilizing the "without misfire" data from FIG. 3, and similar data taken at other engine speeds, it can be seen that the PIP profile measurement does not vary significantly with engine speed. Thus, FIG. 4 illustrates that the production inaccuracies of the PIP wheel 22 results in a higher percent change in PIP period for a particular cylinder (i.e. cylinder #2) than for the other cylinders, for the particular production engine. The misfire detection strategy of the present invention learns the PIP profile of FIG. 4 automatically during normal driving of the vehicle, allowing for detection of cylinder misfire during substantially all engine operating conditions, including no-load engine operation, as described in greater detail hereinbelow.

Figure 5:
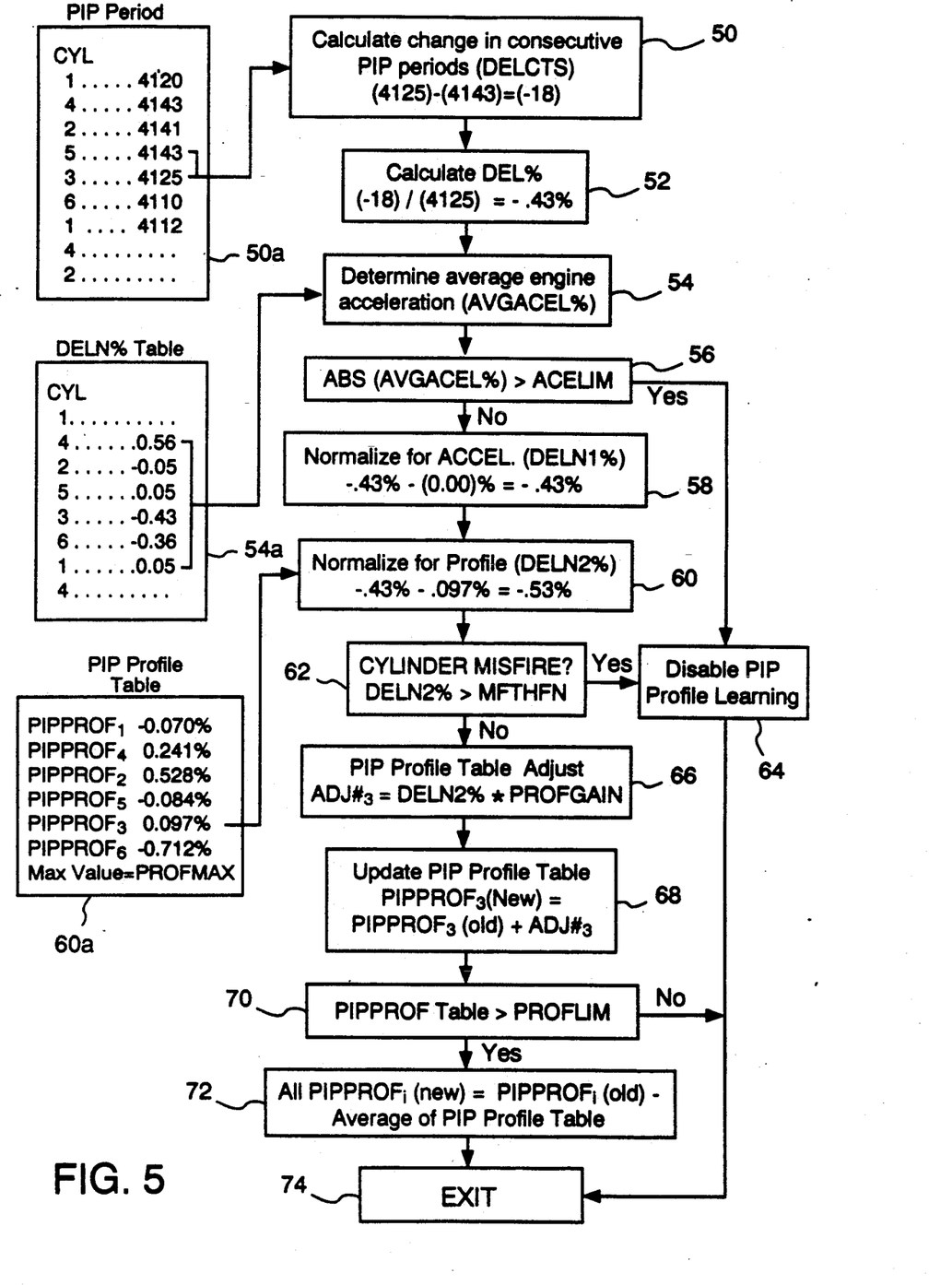
FIG. 5 is a flow chart detailing the adaptive misfire detection strategy of the present invention.

Referring now to FIG. 5, there is shown a flow chart illustrating the misfire detection strategy of the present invention. In the preferred embodiment, the adaptive strategy is not executed until the engine has warmed up. At step 50, the microprocessor 12 receives data from the position-sensing system 20 (both shown in FIG. 1) and determines the change in consecutive PIP periods. Preferably, each PIP period is measured from falling edge to falling edge of the PIP signal for consecutive power cycles of the engine and represents the number of microprocessor clock ticks. Thus, the PIP period increases with decreasing engine speed. For example, utilizing the typical PIP period data for a 6-cylinder engine shown in box 50a, the change in the consecutive PIP periods is determined by taking the difference between the latest PIP period (e.g. 4125 clock ticks) and the immediately preceding PIP period (e.g. 4143 clock ticks).

At step 52, the change in consecutive PIP periods is preferably expressed as a fraction, or a percent (DEL%), of the last PIP period. This variable, the percent change in PIP period or power cycle time, is generally independent of engine speed. Thus, the value of the DEL% variable typically remains about the same regardless of engine speed for non-misfiring cylinders. This process improves the chronometrics (i.e. time to do calculations) of the implementation of the controller. The percent change in PIP period is the primary parameter for determining engine misfire, as described in greater detail below.

With continuing reference to FIG. 5, at step 54, the microprocessor determines the average engine acceleration (AVGACEL%). It should be noted that the term "acceleration" encompasses both positive acceleration and negative acceleration (i.e. deceleration). For an "N" cylinder engine, the best estimate of the average engine acceleration (per engine firing) over one engine cycle is represented by the median value of a "moving window" of N adjacent DEL% values starting with the N/2th preceding cylinder. Box 54a illustrates a "moving window" of typical values for a six cylinder engine. Preferably, the moving window of DEL% values is stored in the RAM memory. For an engine having an even number of cylinders, the median value is computed as an average of the two middle values. For the data shown in box 54a, the median is computed as the average of 0.05 and −0.05 (i.e. 0.00%). Use of the median value as an estimate of average engine acceleration introduces a delay of one revolution in realizing the engine acceleration. Alternatively, average engine acceleration may be calculated by averaging the same "N" values of DEL%. However, for a misfiring engine, this estimate may be corrupted by the misfiring cylinder, which may attenuate the signal-to-noise ratio. Using a median value instead avoids this disadvantage.

At step 56, the microprocessor takes the absolute value of the AVGACEL% determined at step 54 and performs a comparison to a predetermined engine acceleration threshold (ACELIM). This comparison is performed to detect an unstable engine operating condition due to excessive acceleration/deceleration. The ACELIM threshold has a value which is dependent upon the number of cylinders and represents the threshold beyond which adaptive learning and misfire detection are disabled. The ACELIM threshold value is dependent on the number of cylinders in engine. In the preferred embodiment, the engine acceleration threshold has a value set at about 1.5, for a typical 6-cylinder engine, and is calibrated to be below the rapid tip-in to wide-open throttle position. If the average engine acceleration has exceeded the engine acceleration threshold, control flow jumps to step 64 and the microprocessor disables PIP profile learning and misfire detection, as described in greater detail below.

With continued reference to FIG. 5, if the engine is not experiencing excessive acceleration or deceleration, at step 58 the percent change in PIP period (DEL%) is normalized for the engine acceleration by subtracting AVGACEL% to obtain a normalized percent change in PIP period (DELN1%). Thus, this normalized percent change in PIP period is compensated for engine acceleration and speed, rendering it independent of acceleration and speed.

At step 60, the PIP profile correction to DELN1% is performed utilizing the PIP profile table stored in the keep-alive memory 18 (shown in FIG. 1). A PIP profile table containing typical values for a 6-cylinder engine is shown in box 60a. The values of the PIP profile table entries are clipped at +/− PROFMAX value. The PROFMAX value is dependent on the number of engine cylinders and the tolerances of the PIP wheel. A typical engine with good tolerances preferably has an associated PROFMAX value of about 0.4. PIP wheels with looser tolerances will require a higher PROFMAX value. As shown in FIG. 5, the PIP profile table preferably contains a set of calibration parameters, or numbers, one for each engine cylinder, which represent the percent change in PIP periods of the engine under no-load operation without misfire. Since the entries represent the change in PIP periods at a constant engine speed, by definition the entries in the PIP profile table preferably add up to zero.

Figure 6:
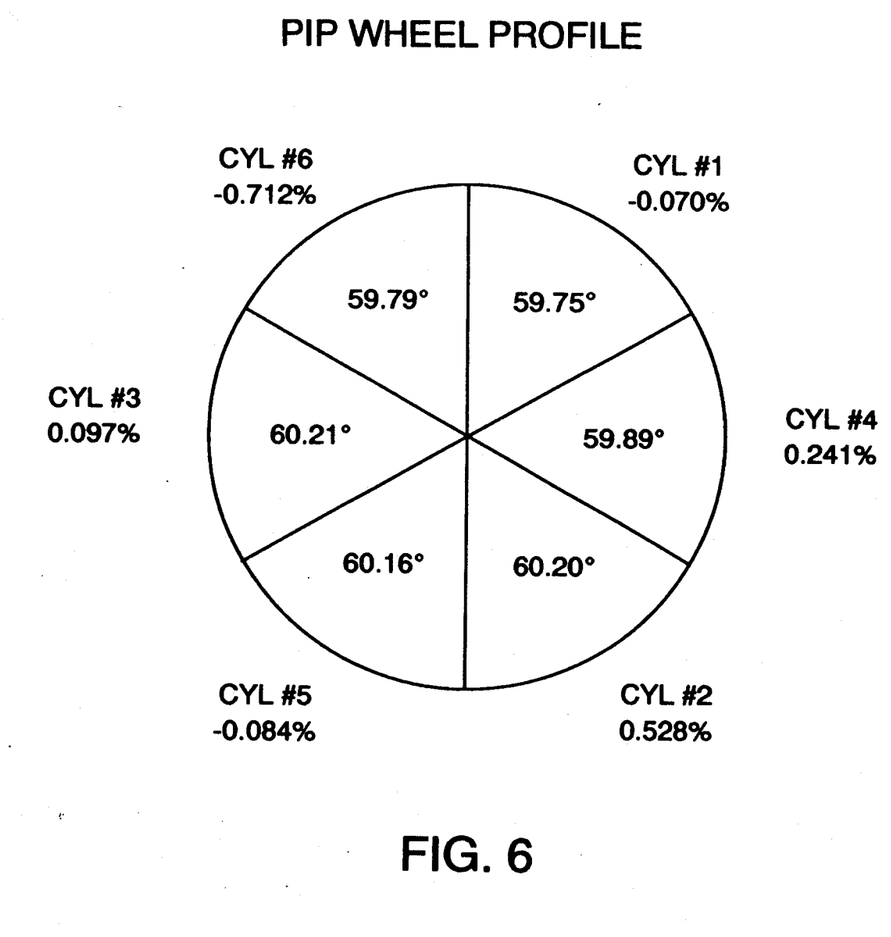
FIG. 6 is a geometric representation of the PIP wheel shown in FIG. 1 for use with a typical 6-cylinder internal combustion engine.

Referring now to FIG. 6, there is shown a geometric representation of the PIP wheel 22 shown in FIG. 1. The vanes 24, 26 and 28 divide the PIP wheel 22 into six substantially equal segments, one for each cylinder of the engine. Ideally, each segment represents 60° of camshaft rotation, which rotates at half the speed of the crankshaft. Machining inaccuracies during production, however, result in variations from 60° segments. The values shown in FIG. 6 are typical values for a camshaft mounted wheel in a distributor-type ignition system. Values for a typical crankshaft-mounted PIP wheel in a distributorless ignition system (DIS) differ slightly. For example, tolerances in a typical DIS system result in smaller deviations from 60° and result in symmetrical placement of the teeth, such that the o value for cylinder #1 would be identical to the value for cylinder #5, and so on.

The values of the PIP profile table thus represent the percent change in consecutive PIP periods for an engine under no-load operation without cylinder misfire. Since the values are preferably determined based on the PIP wheel 22, the values are unique for the production engine. In the preferred embodiment, the profile correction of step 60 is performed by subtracting the PIP profile table value for a particular cylinder (e.g. PIPPROF$_3$=0.097%) from the normalized PIP period change (e.g DELN1%=−0.43%) to obtain the second normalized PIP period change (e g. DELN2%=−0.53%). Thus, the DELN2% parameter compensates for the production inaccuracies associated with the PIP wheel for a particular production engine.

Figure 7:
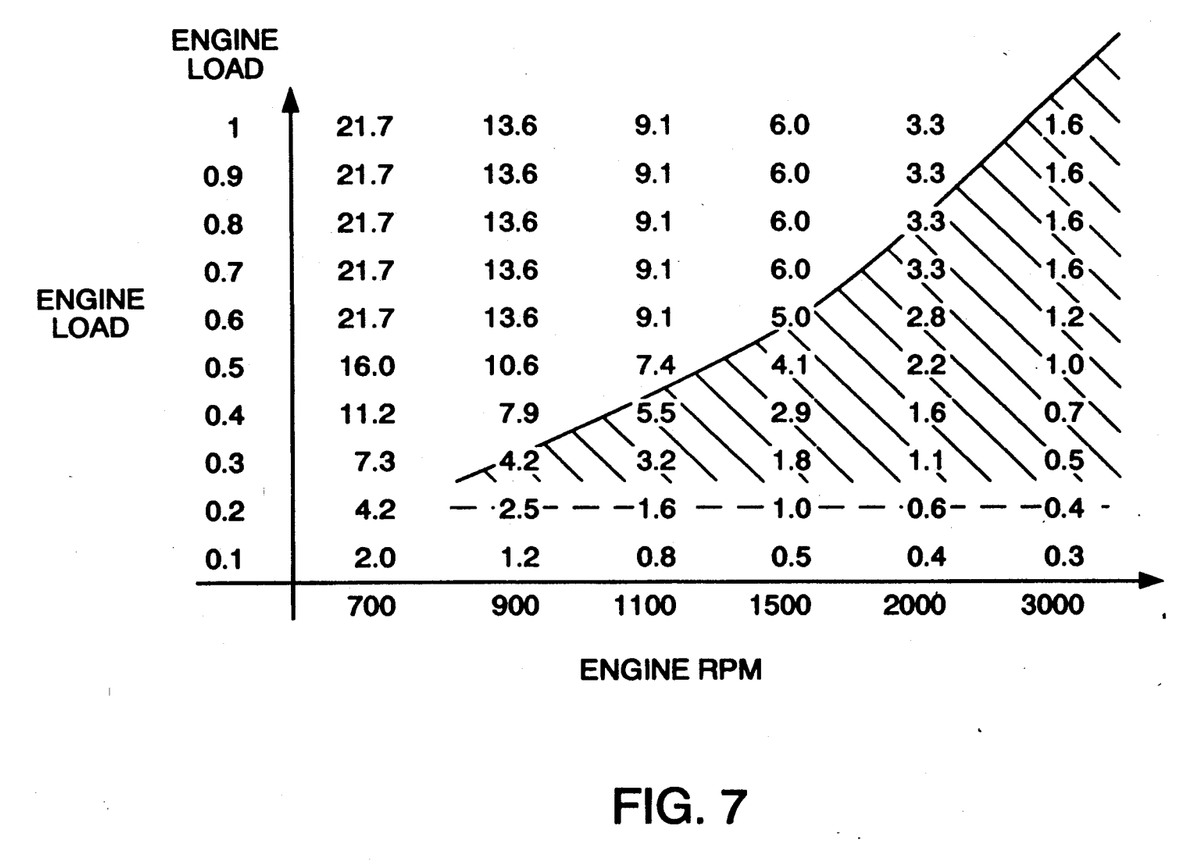
FIG. 7 is an illustration of the misfire threshold function table for a typical 6-cylinder internal combustion engine, for use with the present invention.

Referring once again to FIG. 5, at step 62 the microprocessor determines whether a cylinder misfire has occurred by performing a comparison between the DELN2% value and a misfire threshold function (MFTHFN) value. The MFTHFN function value is obtained from a table, as shown in FIG. 7, stored in the ROM memory of the controller. The table values shown are typical values for a 6-cylinder engine. In the preferred embodiment, the misfire threshold function table values represent the minimum increase in PIP period for the misfiring cylinder and is a function of engine operating conditions such as load or torque and engine RPM. The load variable for use in determining the MFTHFN table values is computed internally by the controller utilizing measured engine variables, such as air flow and engine RPM. Of course, the load could also be computed utilizing other variables, such as spark timing or exhaust gas recirculation (EGR) settings, in combination with air flow and RPM. The misfire threshold function table can be determined by introducing cylinder misfires at various engine loads, tracking the corresponding DELN2% values and introducing them into a speed/load map similar to a spark table.

The microprocessor 12 preferably cooperates with the RAM memory 14 and keeps track of the presence of cylinder misfires, as required for compliance with Environmental Protection Agency (EPA) regulations, such as OBDII. For example, a running count of the number of misfires may be used to compute a rolling average of the number of misfires as a proportion or percent of the total engine firings. Accordingly, misfire information may be provided to the vehicle operator, such as through an audiovisual indicator or the like mounted on the vehicle dashboard, for diagnostic purposes.

With continued reference to FIG. 7, a wide-open throttle condition is generally indicated by a value of about "1" on the vertical axis and an engine no-load condition is generally indicated by a value of between 0.1 and 0.25 on the vertical axis. Generally, normal vehicle operation for automatic transmission vehicles is associated with misfire threshold function values in the "hashed" area of the table. As shown in FIG. 7, the normal operating values are bounded by the stall curve (i.e. increased engine speed due to heavy throttle tip-in without attendant vehicle acceleration), which is approximately indicated by the solid curved line, and the approximate no-load line, which is indicated by the dotted horizontal line.

Referring once again to FIG. 5, if a cylinder misfire is detected at step 62, the microprocessor disables PIP profile learning at step 64. Preferably, the suspension of PIP profile learning is for a limited duration (e.g. for two engine cycles) following the detection of a misfire at step 62 or the detection of an unstable engine operating condition (i.e. excessive acceleration or deceleration) previously determined at step 56. If no cylinder misfiring is detected at step 62, the microprocessor adaptively adjusts the PIP profile table at step 66. Specifically, this adaptive adjustment to the PIP profile table consists of determining an adjustment value (e.g. ADJ#3) based on the DELN2% value and a gain factor (PROFGAIN). Since the value of PROFGAIN is typically less than "1", the adaptive adjustment consists of algebraically adding a fraction of DELN2% to the corresponding cylinder location in the PIP profile table. Preferably, the PROFGAIN value is selected to insure rapid adaptation of the PIP profile table without abnormal excursions.

Figure 8:
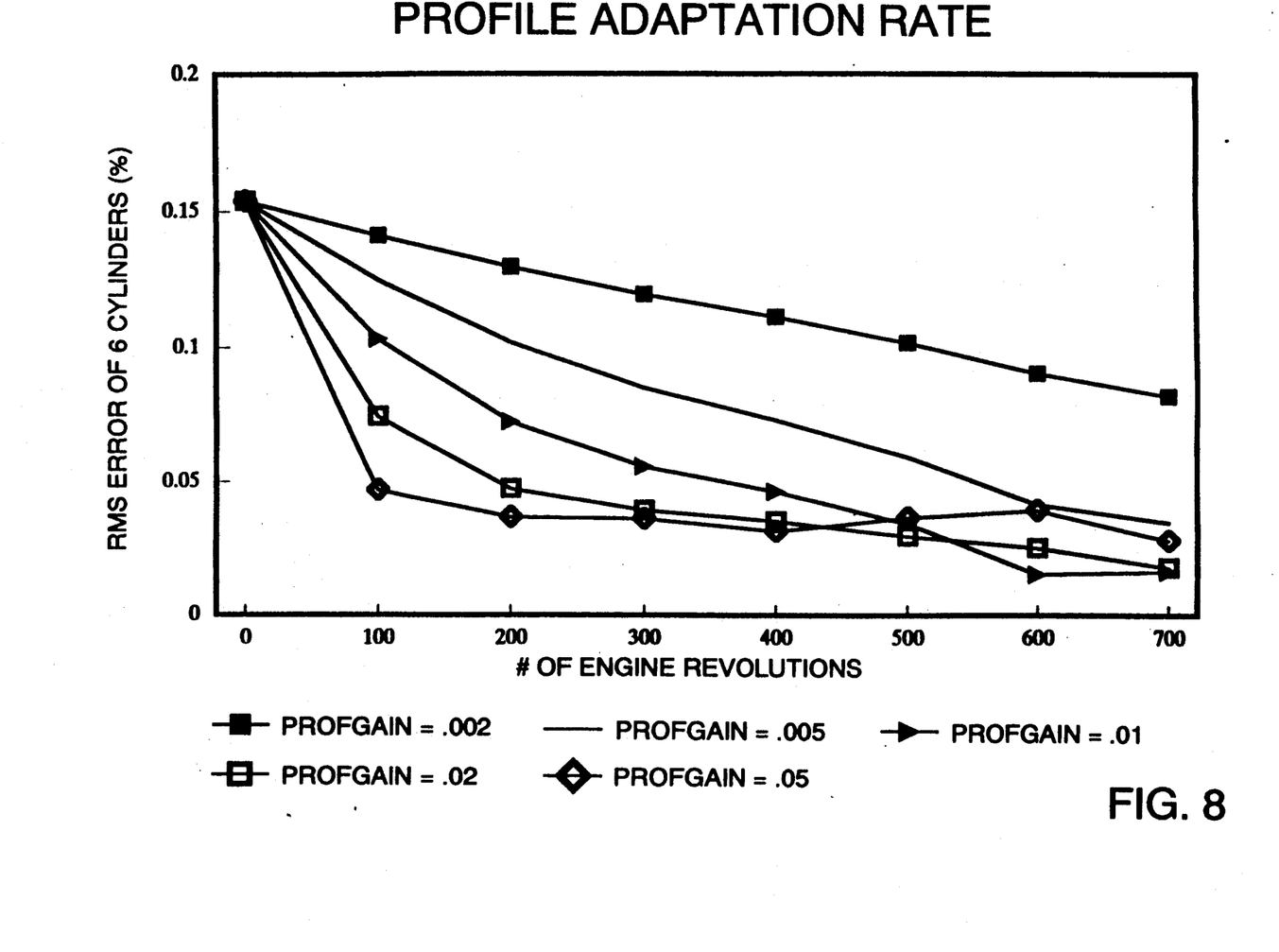
FIG. 8 is a graphical illustration of profile learning with various profile adaptation rates for use with the present invention.

Referring now to FIG. 8, there is shown a graphical representation of profile learning with various PIP profile table adaptation rates. As illustrated, the PROFGAIN value determines how quickly the PIP profile table is adjusted for the production inaccuracies of the PIP wheel during no-load engine operation. Thus, for a PROFGAIN value of 0.002, about 700 engine revolutions are required to reduce the RMS error from 0.15 to about 0.08. At this adaptation rate, the RMS error would be at an acceptable level of less than 0.04 after 4-5 minutes of engine operation at approximately 1200 RPM. Of course, a combination of several different PROFGAIN values could be utilized over time to obtain a desired PIP profile table adaptation rate.

Referring again to FIG. 5, at step 68 the microprocessor determines the new PIP profile table value by adding the adjustment (i.e. ADJ#3) to the old PIP profile table value and stores the new PIP profile table value in the proper KAM memory location. The adaptive misfire detection strategy of the present invention preferably maintains the balance between PIP profile table values so that the values add to zero. However, under extenuating conditions such as extended acceleration or deceleration, this sum may assume a significantly positive or negative value, requiring normalization of the PIP profile table. Therefore, at step 70 and after each adjustment to the PIP profile table, the microprocessor validates the PIP profile table values. During this validity check, the microprocessor sums the values of the PIP profile table and compares the sum to a predetermined profile limit value (PROFLIM). In the preferred embodiment, the value of PROFLIM is approximately 0.1. If the absolute value of the sum of the table values does not exceed PROFLIM, control flow jumps to step 74 and the adaptive misfire detection strategy routine is exited. If, however, the sum of the table values does exceed PROFLIM, the microprocessor performs a global normalization of the PIP profile table values at step 72. This simultaneous normalization of the PIP profile table occurs by subtracting the average of all of the PIP profile table values from each of the values, thereby adjusting the sum of the table toward the desired value of zero.

Figure 9:
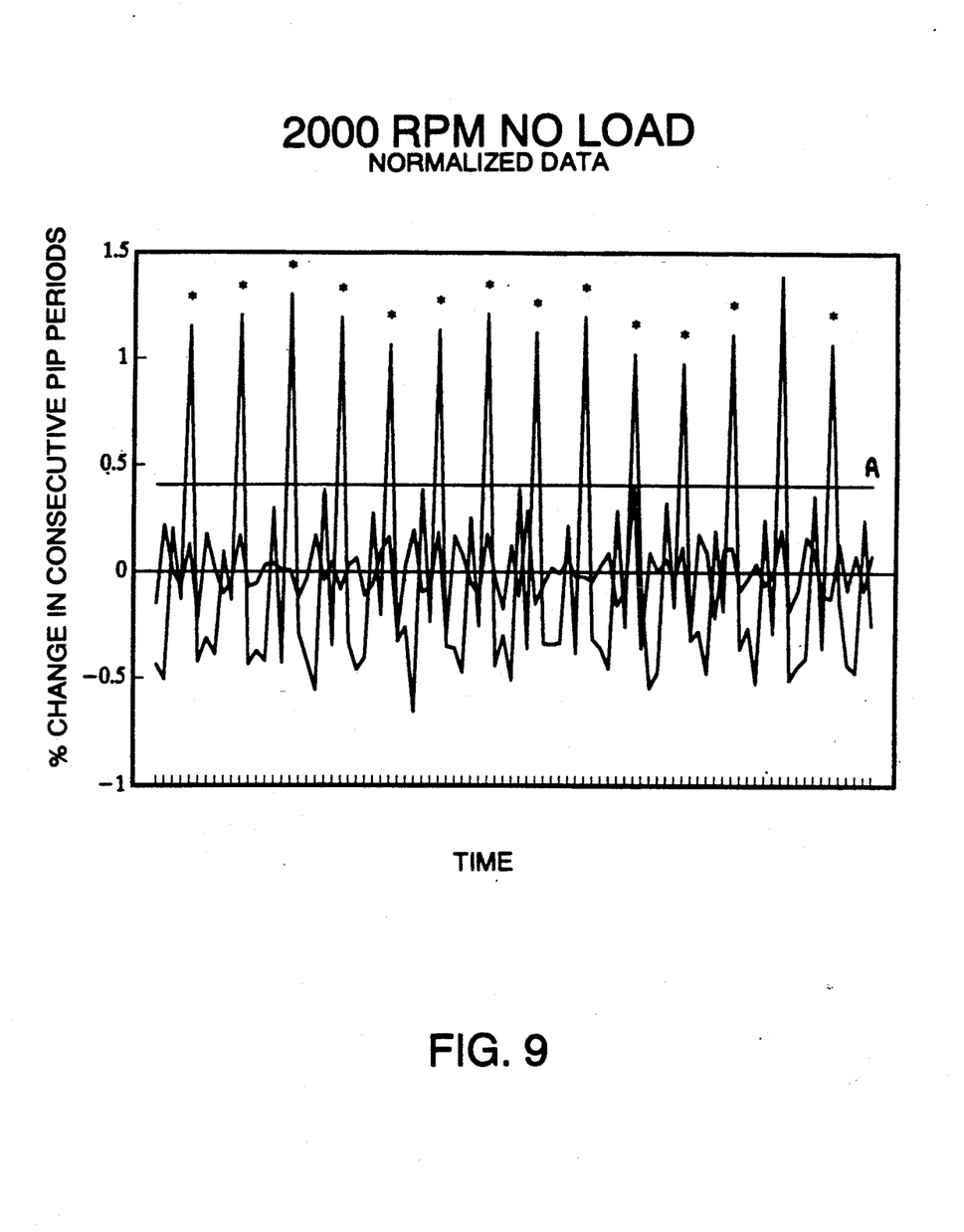
FIG. 9 is a graphical illustration of data representing the percent change in consecutive PIP periods for a typical 6-cylinder internal combustion engine with and without cylinder misfire, during no-load operation, normalized utilizing the adaptive misfire detection strategy of the present invention.

Referring now to FIG. 9, there is shown a graphical representation of the percent change in consecutive PIP periods for a typical 6-cylinder internal combustion engine with and without cylinder misfire, during no-load operation, normalized utilizing the adaptive method of misfire detection of the present invention discussed above. The horizontal axis "A" represents a misfire threshold level, such as that obtained from the table shown in FIG. 7. As can be seen, cylinder misfires during no-load operation are easily detected after normalizing the change in the PIP period for engine acceleration and the adaptively corrected PIP profile table values.

It is understood, of course, that while the forms of the invention herein shown and described constitute the preferred embodiments of the invention, they are not intended to illustrate all possible forms thereof. It will also be understood that the words used are words of description rather than limitation, and that various changes may be made without departing from the spirit and scope of the invention disclosed.

We claim:

1. An adaptive method of detecting a misfiring cylinder in a spark-ignited internal combustion engine controlled by an electronic controller having memory, the method comprising the steps of:

normalizing an engine acceleration-independent and engine speed-independent power cycle time differential signal for particular cylinder, obtained from consecutive power cycle time periods of an engine cycle, utilizing a calibration parameter stored in the memory for the particular cylinder, to obtain a normalized power cycle time differential signal for the particular cylinder;

comparing the normalized power cycle time differential signal to a misfire threshold signal stored in the memory to determine if the cylinder is misfiring, the misfire threshold signal having a value based on at least one engine operating parameter; and adaptively modifying the calibration parameter stored in the memory based on the comparison.

2. The method of claim 1 wherein the calibration parameter represents the percent change in consecutive power cycle time periods for the engine.

3. The method of claim 1 wherein the misfire threshold signal is based on at least engine torque and engine speed.

4. The method of claim 1 further comprising the step of disabling the adaptive modification of the calibration parameter for at least one engine cycle if the cylinder is misfiring, thereby limiting the adaptive modification to stable engine operating conditions.

5. The method of claim 1 further comprising the step of comparing the average engine acceleration during the engine cycle to an acceleration threshold to detect an excessive acceleration condition.

6. The method of claim 5 further comprising the step of disabling the adaptive modification of the calibration parameter for at least one engine cycle if an excessive acceleration condition is detected, thereby limiting the adaptive modification to stable engine operating conditions.

7. The method of claim 5 further comprising the step of disabling the comparison to detect misfiring for at least one engine cycle if an excessive acceleration condition is detected, thereby limiting the misfire detection to stable engine operating conditions.

8. The method of claim 1 wherein the step of adaptively modifying the calibration parameter includes the step of limiting the value of the calibration parameter so as not to exceed a predetermined limit.

9. The method of claim 1 further comprising the step of controlling the rate of adaptive modification utilizing a gain factor.

10. The method of claim 1 further comprising the step of validating the calibration parameter stored in the memory for each of the cylinders of the engine after each adaptive modification of a calibration parameter, including the step of normalizing each calibration parameter such that the sum of the calibration parameters is approximately zero.

11. An adaptive method of detecting a misfiring cylinder in a spark-ignited internal combustion engine controlled by an electronic controller having a memory, the method comprising the steps of:

obtaining an engine speed-independent percent power cycle time differential signal for a particular cylinder based on consecutive power cycle time periods of an engine cycle;

normalizing the engine speed-independent percent power cycle time differential signal based on the average engine acceleration during the engine cycle, to obtain an engine acceleration-independent power cycle time differential signal for the cylinder;

normalizing the engine acceleration-independent power cycle time differential signal based on a calibration parameter stored in the memory and associated with the cylinder, to obtain a normalized power cycle time differential signal for the cylinder;

comparing the normalized power cycle time differential signal to a misfire threshold signal associated with at least one engine operating condition to determine if the cylinder is misfiring; and adaptively modifying the calibration parameter based on the comparison.

12. The method of claim 11 wherein the calibration parameter represents the percent change in consecutive power cycle time periods associated with a particular cylinder of the engine.

13. The method of claim 11 wherein the misfire threshold signal is based on at least engine torque and engine speed.

14. The method of claim 11 further comprising the step of disabling the adaptive modification of the calibration parameter for at least one engine cycle if the cylinder is misfiring, thereby limiting the adaptive modification to stable engine operating conditions.

15. The method of claim 11 further comprising the step of comparing the average engine acceleration during the engine cycle to an acceleration threshold to detect an excessive acceleration condition.

16. The method of claim 15 further comprising the step of disabling the adaptive modification of the calibration parameter for at least one engine cycle if an excessive acceleration condition is detected, thereby limiting the adaptive modification to stable engine operating conditions.

17. The method of claim 15 further comprising the step of disabling the comparison to detect misfiring for at least one engine cycle if an excessive acceleration condition is detected, thereby limiting the misfire detection to stable engine operating conditions.

18. The method of claim 11 wherein the step of adaptively modifying the calibration parameter includes the step of limiting the value of the calibration parameter so as not to exceed a predetermined limit.

19. The method of claim 11 further comprising the step of controlling the rate of adaptive modification utilizing a gain factor.

20. The method of claim 11 further comprising the step of validating the calibration parameter stored in the memory for each of the cylinders of the engine after each adaptive modification of a calibration parameter, including the step of normalizing each calibration parameter such that the sum of the calibration parameters is approximately zero.

* * * * *